United States Patent [19]

Foster, Jr.

[11] 3,768,984

[45] Oct. 30, 1973

[54] WELDING RODS

[75] Inventor: James L. Foster, Jr., Ligonier Twp., Westmoreland County, Pa.

[73] Assignee: Eugene F. Buell

[22] Filed: Apr. 3, 1972

[21] Appl. No.: 240,818

[52] U.S. Cl................ 29/182.8, 29/191.6, 29/193, 75/204, 148/23
[51] Int. Cl............................................... B22f 3/00
[58] Field of Search.................. 219/145; 29/182.7, 29/182.8, 182.5, 191.6, 193; 148/23; 75/204

[56] References Cited
UNITED STATES PATENTS

| | | | |
|---|---|---|---|
| 3,318,729 | 5/1967 | Siegle et al. | 148/23 X |
| 3,329,487 | 7/1967 | Sowko et al. | 75/203 X |
| 3,539,307 | 11/1970 | Baumel | 29/182.8 |

Primary Examiner—Stephen J. Lechert, Jr.
Attorney—Buell, Blenko & Ziesenheim

[57] ABSTRACT

A gas applied carbide weld rod is provided which is made up of a mild steel tube filled with a mixture of about 65 to 70% of 20–60 mesh $W_2C$, about 20% to 25% of 80–200 mesh Macro WC, about 9% to 12% of 80–200 mesh Sintered WC and about 1.0% to 1.5% of flux.

6 Claims, No Drawings

WELDING RODS

This invention relates to welding rods and particularly to a gas applied carbide welding rod for hard surfacing steel particularly for retipping roller bits and like.

Gas applied carbide welding rods for retipping have been available for many years. Such rods normally consist of cast carbide and flux in a mild steel jacket. The ratio of carbide to steel averages about 40–60 in such conventional rods. The flux is normally silico manganese although molasses is sometimes used alone or combined with silico manganese. The cast carbide used in such rods is an eutectic mixture of $W_2C$ and WC with the lowest melting point possible on the $W + C$ curve. When this conventional rod is applied by melting, some of the cast carbide is dissolved in the molten steel increasing the carbon and tungsten content of the steel. This relatively hard wear resistant matrix surrounds the cast carbide grains. The greater the amount of cast carbide dissolved, the harder and more wear resistant is the matrix and the more difficult it becomes to flow the rod onto the part being hard surface which in turn causes more of the cast carbide to dissolve. The result in that the hardness of the weldment varies with the size of the part being surfaced, with the skill of the welder and with the technique being used. The result is that a great variation in weldment hardness results as between different welders using the same conditions as well as resulting from variations in size of the weldment. Some of this variation can be and is controlled by varying the grain or mesh size of the cast carbide being used but there is a practical limit to this and in a given weld job it is not practical to expect a welder to change rods as conditions change. As a result failures in the parts treated is common either from their being too hard and breaking or too soft and mushrooming over.

I have discovered a welding rod composition for gas application which overcomes these problems of the prior art gas applied rods. I provide a rod having a mixture of various forms of tungsten carbide which controls solution of tungsten and carbon into the steel and thus eliminate the uncontrolled solution of tungsten and carbon which heretofore caused brittleness and softness in the same piece of work.

A welding rod according to my invention may include a mild steel tube filled with a mixture of:

| | |
|---|---|
| 20–60 mesh $W_2C$ | 65–70% by weight |
| 80–200 mesh Macro WC | 20–25% by weight |
| 80–200 mesh Sintered WC | 9–12% by weight |
| Flux | 1.0–1.5% by weight |

Preferably I provide a narrower range of mesh sizes in a mild steel tubing filled with a mixture of the following composition:

| | |
|---|---|
| 30–40 mesh (U.S.) $W_2C$ | 65–70% by weight |
| 100–160 mesh (U.S.) Macro WC | 20–25% by weight |
| 100–160 mesh (U.S.) Sintered WC | 9–12% by weight |
| Flux | 1.0–1.5% by weight |

The flux may be silico manganese, molasses or mixtures of silico manganese and molasses. The ratio of steel to tungsten carbide is preferably in the range 57.5% to 62.5% steel to 42.5% to 37.5% tungsten carbide. In order to get this ratio a mild steel wire may be inserted within the mixture in the tubing where the wall thickness of the tubing is not sufficient to provide the necessary amount of steel.

A preferred specific composition for filling the steel tube is:

| | |
|---|---|
| 30–40 mesh $W_2C$ | 67.0% by weight |
| 100–160 mesh Macro WC | 21.5% by weight |
| 100–160 mesh Sintered WC | 10.2% by weight |
| Powdered silico manganese | 1.3% by weight |

The preferred steel to carbide ratio is 60/40. In the foregoing composition the term "Macro WC" is used to define the single large grains of WC formed by combining W and C in the first phase of making WC by reacting $WO_3$ with carbon in an electric furnace. The term "Sintered WC" is used to refer to crushed sintered WC scrap carbide which is normally 3.5 to 8.0% cobalt matrix with the balance 0.75 to 6.0 micron grain size WC carbide. "$W_2C$" as used in this application refers to the product of that composition formed by reacting $WO_3$ with carbon at high temperatures and to the eutectic mixture of $W_2C$ and WC, frequently called "cast carbide" in the trade.

In order to compare the effectiveness of this material two separate test runs were made involving six roller bits in each test. The details of the tests are as follows.

TEST I

Six roller bits 4¾ inch in diameter were retipped using a welding rod of the preferred specific composition set out above. These bits were run alongside like bits retipped with the conventional carbide rod previously mentioned in normal dolomite. In this particular area it was the practice to retip bits twice before discarding them. After the second tip the ultimate life was determined by bearing wear or tooth wear. On those bits where tooth wear determined the ultimate life bearings were too worn to warrant retipping of the teeth. In this test dull bits in for their first retipping were built up with the rod of this invention and run under the same conditions as the standard retipped bits. All six bits were run until the bearings were too worn to continue the test. All bits had remaining life from the first retip, whereas the bits which were retipped with the conventional weld rod had all been retipped twice and following the second retipping about 50% had been discarded for tooth failure before the bearings failed. This test showed that the material of this invention more than doubled the expected tooth life, thus saving the expense of retipping the bit for the second time.

TEST II

This test was conducted in an area of white ganister where tooth mushing and breakage prevented economical use of retipped bits. As a result conventional retipped bits were not used as unacceptable. Worn bits which would have been discarded were retipped using the same rod as in Test I and run in this difficult rock. Performance was equal to or better than new bits. Only slight spalling and no mushrooming occurred. The spalling did not affect the bit life.

These two tests indicate that the welding rod of this invention will give strong weldments of fairly uniform hardness and good wear resistance, far superior to that obtainable with normal cast carbide rods.

The rod of this invention is uniquely different from the carbide rods heretofore available in that it has a matrix whose hardness can be controlled over a wide range of operating conditions with relative ease thus automatically correcting for article size and differences in welding skill, it has dispersed in the matrix numerous small grains of tungsten carbide (WC) which prevent erosion of the matrix but have a minimal effect on the chemistry of the matrix and it has large grains of $W_2C$ which, being properly supported, give optimum cutting performance.

While I have illustrated and described a present preferred practice of my invention in the foregoing specification, it will be understood that this invention may be otherwise embodied within the scope of the following claims.

I claim:

1. A gas applied welding rod comprising a mild steel tube filled with a mixture consisting essentially of about 65% to 70% by weight of 30–40 mesh $W_2C$, about 20% to 25% by weight of 100–160 mesh single large grains of WC formed by combining W and C in the first phase of making WC by reacting $WO_3$ with carbon in an electric furnace, about 9% to 12% by weight of 100–160 mesh crushed sintered WC scrap carbide having 3.5 to 8% cobalt matrix with the balance 0.75 to 6.0 micron grain size WC carbide and about 1.0 to 1.5% flux.

2. A gas applied welding rod as claimed in claim 1 wherein the flux is selected from the group consisting of silico manganese, molasses and mixtures thereof.

3. A gas applied welding rod as claimed in claim 1 wherein the ratio of steel to tungsten carbide in the rod is about 57.5% to 62.5% steel to about 42.5% to 37.5% carbide.

4. A gas applied welding rod as claimed in claim 1 wherein the mild steel tube is filled with a mixture consisting essentially of about 67% by weight of 30–40 mesh $W_2C$, about 21.5% of 100–160 mesh single large grains of WC formed by combining W and C in the first phase of making WC by reacting $WO_3$ with carbon in an electric furnace, about 10.2% of 100–160 mesh crushed sintered WC scrap carbide having 3.5 to 8% cobalt matrix with the balance 0.75 to 6.0 micron grain size WC carbide and about 1.3% silico manganese.

5. A gas applied welding rod as claimed in claim 4 wherein the ratio of steel to carbide is about 60% steel to 40% carbide.

6. A gas applied welding rod as claimed in claim 1 wherein a mild steel tube is filled with a mixture consisting essentially of about 65% to 70% by weight of 20–60 mesh $W_2C$, about 20% to 25% by weight of 80–200 mesh single large grains of WC formed by combining W and C in the first phase of making WC by reacting $WO_3$ with carbon in an electric furnace, about 9% to 12% by weight of 80–200 mesh crushed sintered WC scrap carbide having 3.5 to 8% cobalt matrix with the balance 0.75 to 6.0 micron grain size WC carbide and about 1.0 to 1.5% flux.

* * * * *